United States Patent [19]
Abraham et al.

[11] 3,806,744
[45] Apr. 23, 1974

[54] HIGH FREQUENCY STEPPER MOTOR

[75] Inventors: Dennis G. Abraham, Vestal; Stephen H. Mills, Newark Valley, both of N.Y.

[73] Assignee: International Business Machines Corporation, Armonk, N.Y.

[22] Filed: Dec. 14, 1972

[21] Appl. No.: 315,277

[52] U.S. Cl. .................................. 310/49, 310/67
[51] Int. Cl. ......................................... H02k 37/00
[58] Field of Search ............ 310/49, 162, 163, 164, 310/67, 269, 114; 318/138, 685, 696

[56] References Cited
UNITED STATES PATENTS

| 3,604,965 | 9/1971 | Stroud | 310/67 |
| 3,169,203 | 2/1965 | Lavin | 310/156 |
| 3,560,774 | 12/1968 | Reeves | 310/49 |
| 2,066,779 | 1/1937 | Himmel | 310/67 |
| 2,682,617 | 6/1954 | Reich | 310/67 |
| 2,774,922 | 12/1956 | Thomas | 310/67 |
| 3,483,406 | 12/1969 | Inaba | 310/49 |
| 3,462,667 | 8/1969 | Jackson | 310/49 |
| 3,469,123 | 9/1969 | Inaba | 310/49 |

*Primary Examiner*—R. J. Skudy
*Attorney, Agent, or Firm*—George E. Clark

[57] ABSTRACT

A high frequency stepper motor includes a number of fixed laminated stators with windings wound about a support shaft between the stators. An outer rotor is constructed of a non-magnetic material with a number of magnetic inserts spaced around the periphery of the rotor at positions determined by the number of phases for a multi-phase motor.

4 Claims, 5 Drawing Figures

HIGH FREQUENCY STEPPER MOTOR

BACKGROUND OF THE INVENTION

The present invention relates to stepper motors and more particularly to multi-phase, high-frequency stepper motors having a rotating outer element.

In the prior art, there are many different stepper motor structures.

There are those stepper motors which have an inner rotating element which is normally a relatively heavy rotor.

There are also stepper motors having external rotors which in the prior art have been relatively heavy steel or iron structures.

These relatively heavy structures have a high inertia and thus are limited in high frequency capability.

SUMMARY OF THE INVENTION

Therefore, it is an object of the present invention to provide a stepper motor having a high frequency performance capability.

It is another object of the present invention to provide a stepper motor having a non-magnetic external rotor with magnetic inserts.

It is another object of the present invention to provide a light weight, compact stepper motor having an external rotor constructed of a non-magnetic material with spaced magnetic inserts.

It is a still further object of the present invention to provide a light weight, compact stepper motor having an external non-magnetic rotor with a plurality of spaced magnetic inserts and a plurality of laminated stators on a fixed shaft with windings between the stators.

Accordingly, a preferred embodiment of the present invention includes a light weight, compact stepper motor having a plurality of laminated stators mounted on a fixed shaft with windings wound around the shaft between the stators, and an external non-magnetic light weight rotor having a number of spaced magnetic inserts around the perimeter thereof.

It is a feature of the present invention that multi-phase operation may be readily obtained by a staggered positioning of the magnetic inserts in the non-magnetic rotor by a number of degrees of rotation of the rotor to achieve the desired phase relationship.

The foregoing and other objects, features and advantages of the invention will be apparent from the following more particular description of a preferred embodiment of the invention as illustrated in the accompanying drawing.

DETAILED DESCRIPTION OF A PREFERRED EMBODIMENT

The theory and operation of stepper motors is generally well known to those skilled in the art. No attempt will be made here to describe in detail the operation of a stepper motor. The present invention is concerned with the structure of stepper motors rather than the electrical characteristics for operation thereof.

Figure 1:
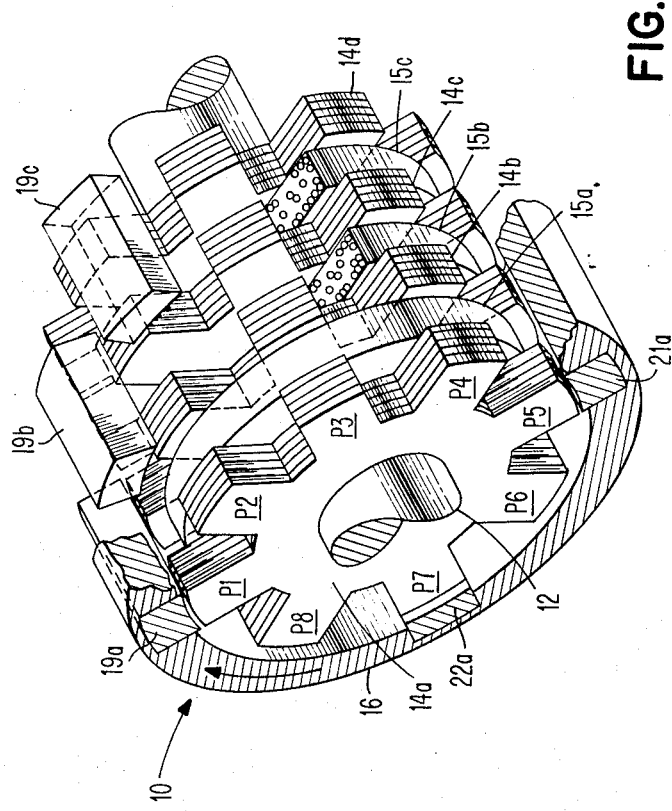
FIG. 1 is a cutaway isometric view of a light weight compact stepper motor embodying the present invention.

Referring now to FIG. 1, a light weight, compact stepper motor is shown in a cutaway isometric view. A fixed shaft 12 supports laminated stators 14a, 14b, 14c and 14d for a three-phase stepper motor. Windings 15a, 15b and 15c for each of the three phases respectively are toroidally wound between the laminated stators such as 15a being wound between stators 14a and 14b, winding 15b being wound between stators 14b and 14c and winding 15c being wound between stators 14c and 14d.

In the embodiment as shown in FIG. 1, each of the stators 14a, 14b, 14c and 14d have a number of teeth which are identified as P1, P2, P3, P4, P5, P6, P7 and P8.

Although FIG. 1 shows all P1 aligned for the various stators 14, a, b, c, and d, other embodiments of the invention might have the teeth of the various stator elements staggered to intercept the rotating magnetic inserts 19a, 19b, 19c etc. at different points of the rotation of external non-magnetic rotor 16. External rotor 16 may be constructed of a light weight non-magnetic material such as aluminum.

Figure 2:
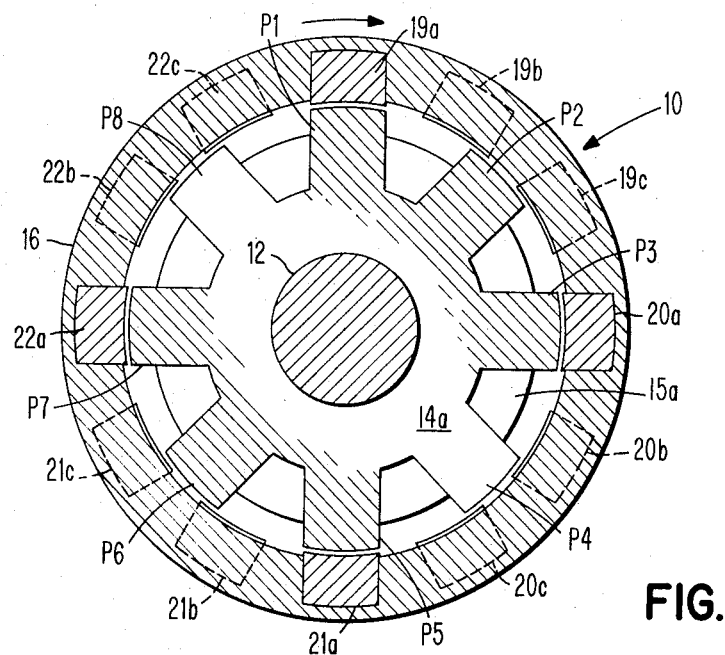
FIG. 2 is an end sectional view of the stepper motor structure shown in FIG. 1 in which the rotor is in a position where there is alignment between stator poles and magnetic inserts for a first phase of a multi-phase system.
Figure 4:
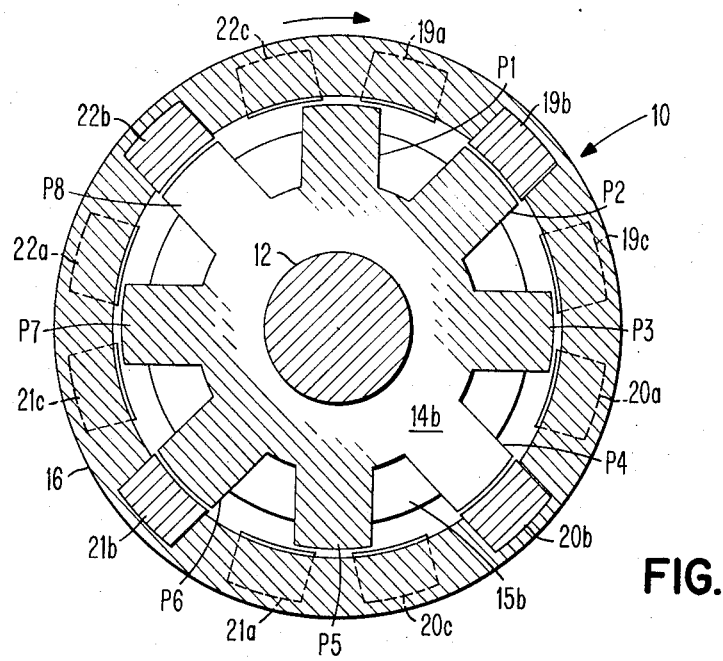
FIG. 4 is an end section view similar to FIG. 2 in which the external rotor has moved to a position where there is alignment between stator poles and magnetic inserts for a second phase of a multi-phase system.
Figure 5:
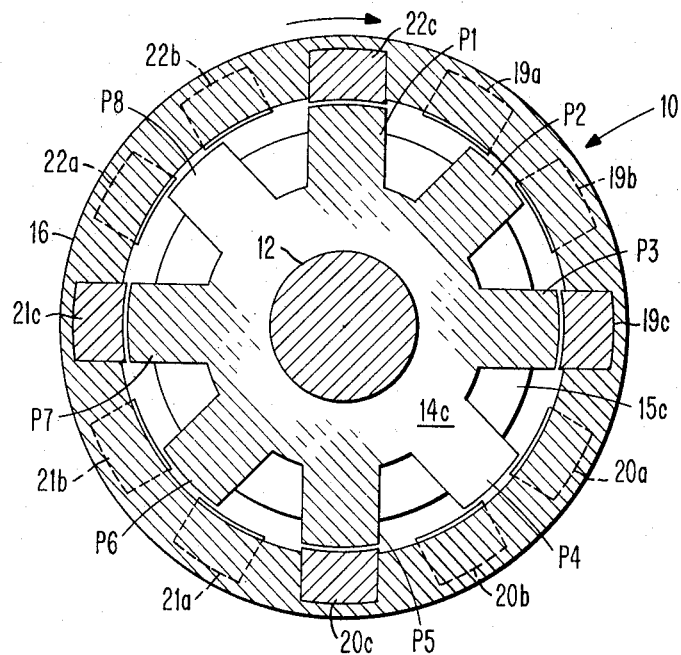
FIG. 5 is an end section view similar to FIG. 4 in which the external rotor has moved to a position where there is alignment between the stator poles and the magnetic inserts for a third phase of a multi-phase system.

In the embodiment shown in FIG. 1, rotor 16 carries magnetic inserts 19a, 19b, 19c which are shown in the cut-away view plus three additional groups of magnetic inserts which are shown more clearly in FIGS. 2, 4 and 5 as 20a, b, and c; 21a, b, and c and 22a, b and c. FIG. 1 shows very clearly how each magnetic insert overlaps a pair of stators such as 14a and 14b for insert 19a or 14b and 14c for insert 19b or stators 14c and 14d for insert 19c.

Figure 3:
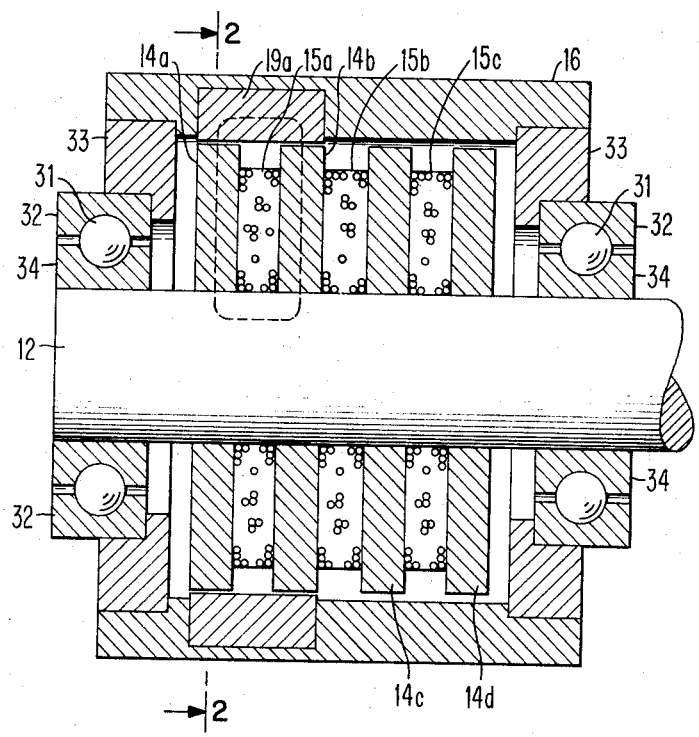
FIG. 3 is a side cross-section view of a stepper motor structure as in FIG. 1.

Referring now to FIGS. 2, 3, 4 and 5, the positioning of the various components of stepper motor 10 will be described in more detail with respect to rotation of non-magnetic rotor 16. At the instant of rotation shown in FIG. 2, magnetic insert 19a is aligned with stator pole P1, magnetic insert 20a is aligned with pole P3, magnetic insert 21a is aligned with pole P5 and magnetic insert 22a is aligned with pole P7. The magnetic insert 19b, 19c, 20b, 20c, 21b, 21c, 22b and 22c are shown as dotted line inserts around the periphery of rotor 16. The section for FIG. 2 is taken through the first stator 14a as shown in FIGS. 1 and 3.

It should also be noted from FIG. 2 that stator poles P2, P4, P6 and P8 are not aligned with any of the magnetic inserts in rotor 16.

Referring now to FIG. 4, a section is shown taken through stator 14b in which it is seen that rotor 16 has geometrically rotated 15° in the direction indicated by the arrow so that stator poles P2 are now aligned with magnetic insert 19b, stator poles P4 are now aligned with magnetic insert 20b, stator poles P6 are now aligned with magnetic insert 21b and stator poles P8 are now aligned with magnetic insert 22b.

Referring now to FIG. 5, a section is shown taken through stator 14c showing that non-magnetic rotor 16 has geometrically rotated by 15° from the position shown in FIG. 4. Stator poles P1 are now aligned with magnetic insert 22c, poles P3 are now aligned with 19c, poles P5 are now aligned with 20c, and poles P7 are now aligned with magnetic insert 21c.

Referring now to FIG. 3, further details of the mechanical construction of the high frequency stepper motor according to the present invention will be shown. Support shaft 12 has mounted thereon front and rear inner bearing races 34. Bearing races 34 support bearings 31 which permit rotation of rotor 16. Outer bearing races 32 are affixed to end plates 33 which supports the non-magnetic rotor 16 which carries magnetic inserts such as 19a.

Toroidally wound coils 15a, b and c are shown positioned between stator elements 14a and b, 14b and c, and 14c and d respectively. The dotted line surrounding the upper half of coil 15a and passing through stators 14a, 14b, magnetic insert 19a and support shaft 12 represents the magnetic flux which provides the torque necessary to rotate rotor 16.

Referring again to FIGS. 2, 4 and 5, it can be seen that any two adjacent magnetic inserts will always overlap to a small extent one of the stator poles P1 through P8. Thus, when a current flows in any of the phase coils 15a, b, or c, a magnetic field is created which applies a torque in such a manner as to cause alignment between the magnetic inserts and the respective poles. For example, if it were assumed that the at rest condition of the stepper motor were such as shown in FIG. 2, the application of a current to coils 15a, b, and c in the proper phase relationship will cause a torque to be created which will tend to align magnetic insert 19b with stator pole P2, insert 20b with pole P4, insert 21b with pole P6 and insert 22b with pole P8.

In the manner described above the torque created by the magnetic flux generated by each of the phase coils 15a, 15b and 15c in sequence causes a torque to be created which results in rotation of rotor 16.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A stepper motor for multi-phase operation comprising:
   a support shaft;
   a plurality of stators which exceed the number of phases by one, each of said stators having a plurality of poles;
   a plurality of coils wound about said support shaft, wherein the number of coils is equal to the number of phases; and
   a non-magnetic rotor surrounding said plurality of stators, said rotor having a plurality of spaced magnetic inserts therein equal in number to one-half the number of stator poles times the number of phases.

2. A stepper motor for multi-phase operation, comprising:
   a support shaft;
   a plurality of aligned stators each having a plurality of poles;
   a plurality of coils wound about said support shaft between said plurality of stators; and
   a non-magnetic rotor surrounding said plurality of stators, said rotor supporting a plurality of sets of magnetic inserts, there being one set of magnetic inserts for each of said coils, said sets of magnetic inserts being offset from one another by a number of degrees of rotation to achieve a proper phase relationship.

3. A stepper motor according to claim 2 wherein said sets of magnetic inserts are offset by 30° of rotation of said rotor.

4. A stepper motor according to claim 2 wherein said magnetic inserts are divided into a plurality of sets, and spaced around the periphery of said rotor such that only 1 set of said magnetic inserts is aligned with a first group of said stator poles at any one instant of time.

* * * * *